United States Patent Office 3,772,438
Patented Nov. 13, 1973

3,772,438
ANTIBIOTIC COMPOSITIONS CONTAINING COUMERMYCIN
Harold Leon Newmark, Maplewood, N.J., assignor to Hoffmann-La Roche Inc., Nutley, N.J.
No Drawing. Continuation of abandoned application Ser. No. 721,156, Apr. 15, 1968. This application May 4, 1971, Ser. No. 140,277
Int. Cl. A61k 21/00
U.S. Cl. 424—181         10 Claims and Development Division, Peoria, Ill., under Reg. No. NRRL 2938.

Processes for producing the antibiotic, described, for example, in Belgium Pat. No. 665,237, Dec. 10, 1965, result in a crude complex of antibiotic compounds. At least five active components and an inactive fraction can be isolated from this complex. Of the active components, the compound denoted coumermycin $A_1$ is the most active. Coumermycin $A_1$ is fully methylpyrollated and it has the following formula:

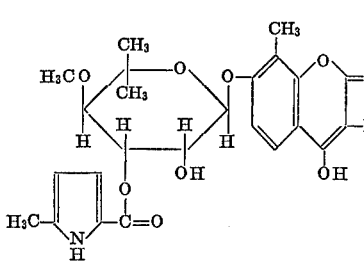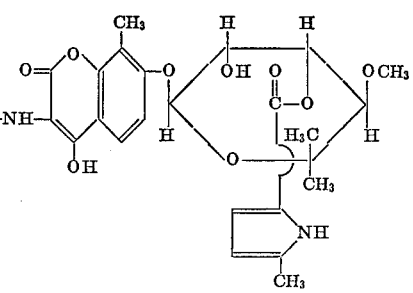

ABSTRACT OF THE DISCLOSURE

A therapeutic composition is described which comprises a mixture of (1) coumermycin and (2) a water-soluble polymeric phosphate salt, either alone or in admixture with either a sugar amine or a salt of a sugar amine with a medicinally acceptable acid.

The composition can be formulated into suitable dosage forms for oral administration and, when so administered, satisfactory blood levels are achieved at relatively low dosages.

RELATED APPLICATIONS

The present application is a continuation of U.S. patent application Ser. No. 721,156, filed Apr. 15, 1968, now abandoned.

BRIEF SUMMARY OF THE INVENTION

The present invention provides compositions which contain the known antibiotic coumermycin in admixture with a water-soluble polymeric phosphate salt, preferably an alkali-metal salt. One or more sugar amines or salts thereof with medicinally acceptable acids, can be present in the compositions as optional components. The compositions are produced simply by mixing coumermycin either with the water-soluble polymeric phosphate salt or with a mixture of such salt and the sugar amine or salt thereof. Subsequently, the composition is worked-up, by conventional procedures and techniques, into a dosage form suitable for oral administration.

The invention serves to provide oral dosage forms from which high levels of coumermycin, an antibiotic known to be effective in the treatment of certain bacterial infection, are absorbed into the blood stream, even when administered at low dosages.

BACKGROUND OF THE INVENTION

The antibiotic coumermycin is produced by culturing *Streptomyces hazeliensis* var. *hazeliensis* nov. sp., an organism isolated from a sample of soil obtained in Metane, Gaspe, Canada. A culture of the organism has been deposited in the collection of microorganisms in the U.S. Department of Agriculture, Northern Utilization Research The utility of coumermycin has, in the past, been limited by its poor and inconsistent absorption into the blood stream from the gastro-intestinal tract when administered orally. Accordingly, in order to offset the unsatisfactory absorption characteristics of the drug, it has been necessary to administer coumermycin in high oral dosages in order to achieve therapeutically effective blood levels. This solution to the problem, however, leaves much to be desired since inherent in the administration of high dosages of coumermycin is the risk of severe toxic reactions, e.g., gasto-intestinal disturbances.

DETAILED DESCRIPTION

The present invention provides new and useful compositions which contain coumermycin as the active ingredient.

More particularly, the invention provides coumermycin-containing compositions which are suitable for oral administration.

In its most specific embodiment, the invention provides coumermycin-containing pharmaceutical compositions, in unit dosage form, which compositions are especially characterized in that, when administered orally even at relatively low dosages, high blood levels are achieved.

The compositions of the invention are mixtures comprising (1) coumermycin and (2) a water-soluble polymeric phosphate salt. The compositions can contain also, as an optional ingredient, a sugar amine or a mixture of sugar amines, either in the form of the free base or in the form of an acid addition salt of the free base.

In carrying out the invention, any therapeutically active component of the coumermycin complex can be used. Such component can be employed in the form of the free acid or in the form of a salt of the free acid. Thus, suitable for use are salts of coumermycin such as, alkali metal salts, for example, sodium, potassium and lithium. Additionally, amine salts of coumermycin free acid, for example, the diethanolamine salt or the triethanolamine salt of coumermycin can be used. In the preferred embodiment of the invention, coumermycin $A_1$, either the free acid or an alkali metal salt thereof, for example, the monosodium salt, is employed. It is to be understood that the previously mentioned salts are merely illustrative of the salts which can be employed in the practice of the invention and such listing is not intended as limitative on the practice of the invention. In general, one can use a salt of coumermycin with any medicinally acceptable base. In the paragraphs which follow the term coumermycin will be used to denote, individually and collectively, the active components of the coumermycin complex both in the form of the free acid and in the form of salts thereof with a medicinally acceptable base.

The polymeric phosphate salts which are used in the practice of this invention are water-soluble compounds. In the form of a 5% solution in water, these salts have a pH above about 8.5. In the preferred embodiment of the invention, a water-soluble, alkali metal polymeric phosphate salt is used. Particularly well suited for use are, for example, tetrasodium pyrophosphate and sodium tripolyphosphate. However, other such alkali metal salts, for example, potassium pyrophosphate, can be employed, if desired.

As indicated heretofore, the polymeric phosphate salt can be used either alone or it can be used in admixture with a sugar amine, a mixture of sugar amines, a salt of a sugar amine with a medicinally acceptable acid or a mixture of such salts. Thus, for example, the polymeric phosphate salt can be used in admixture with N-methyl glucamine, or an acid addition salt of N-methyl glucamine; glucosamine, or an acid addition salt of glucosamine; N-acetyl glucosamine, or an acid addition salt of N-acetyl glucosamine; or N-acetyl galactosamine or an acid addition salt of N-acetyl galactosamine. Mixtures of such sugar amines and sugar amine salts can be employed, if desired. In general, any salt of the sugar amine with a medicinally acceptable acid can be used in carrying out the invention. Such acids include, for example, acids, inorganic or organic in nature, such as, hydrochloric acid, sulfuric acid, nitric acid, phosphoric acid, palmitic acid, stearic acid, etc. The quantity of sugar amine or sugar amine salt which is used in such an embodiment of the invention is variable within a rather wide range. Generally, however, on a weight basis, the amount of sugar amine or salt used will not exceed about 10 times the quantity of the polymeric phosphate salt used. In those embodiments of the invention where a sugar amine or sugar amine salt is employed, it is preferred to use a mixture comprising approximately equal parts by weight of the water-soluble phosphate salt and sugar amine or salt thereof.

The compositions of the invention are readily produced. The preparative method involves simply mixing the water-soluble polymeric phosphate salt, e.g., tetrasodium pyrophosphate, sodium tri-polyphosphate, etc., either alone or in admixture with the sugar amine or a salt thereof, with coumermycin. Generally, the mixing step is carried out without the aid of a solvent. If desired, however, the ingredients can be admixed in a liquid vehicle which is a solvent for the antibiotic and for the polymeric phosphate salt. The quantities of coumermycin and water-soluble polymeric phosphate salt which are used in producing the compositions of the invention are variable within certain prescribed limits. In general, the compositions will contain from about 0.1 part by weight to about 50 parts by weight of the water-soluble polymeric phosphate salt, for each part by weight of coumermycin present. The compositions which are produced in the preferred embodiment of the invention contain from about 1 part by weight to about 10 parts by weight of the polymeric phosphate salt, for each part by weight of coumermycin present. As indicated heretofore, the sugar amine, or an acid addition salt thereof, can be introduced into the product in an amount not exceeding about 10 times the weight of the water-soluble polymeric salt present therein. In the preferred products of the invention the amount of sugar amine, or salt thereof, will not exceed the weight of the polymeric phosphate salt present.

The compositions of this invention, i.e., the mixture of coumermycin with the water-soluble polymeric phosphate salt and, optionally, the sugar amine or acid addition salt thereof, are ultimately worked-up to provide pharmaceutical preparations which are suitable for oral administration. These pharmaceutical preparations may be in solid form, for example, tablets, dragées or capsules. The tablets can be single or multi-layer and they may be coated. In the alternative, the preparations may be in liquid form, for example, solutions, emulsions or suspensions. In producing these pharmaceutical preparations, conventional pharmaceutically acceptable adjuvants and excipients, either organic or inorganic in nature, are employed. Such adjuvants and excipients include water, gelatin, lactose, starches, magnesium stearate, talc, vegetable oils, gums, petroleum jellies, glycerol, ethyl alcohol, propylene glycol and other such materials. The methods and techniques as well as the adjuvants and excipients which are used in formulating the compositions of the present invention into particular solid oral dosage forms will be readily apparent to those skilled in the art. For example, the compositions, with or without appropriate pharmaceutical excipients and adjuvants, can be filled into hard or soft shell capsules. In the alternative, the compositions can be compressed into tablets which can, if desired, be film-coated or sugar-coated. The manner in which the present compositions are formulated into liquid pharmaceutical preparations, e.g., solutions for oral administration, will similarly be apparent to persons skilled in the art. For example, in producing solutions, the coumermycin-polymeric phosphate salt mixture, which may contain also, as optional components, sugar amines and sugar amine salts, can be dissolved in a pharmaceutically acceptable solvent. In an alternate embodiment of the invention, coumermycin and the polymeric phosphate salt and, optionally, the sugar amines and sugar amine salts, can be added separately to the pharmaceutical excipients and adjuvants, either liquid or solid, to form, in situ, the desired mixture of medicament and blood level enhancing agent or agents.

The quantity of inert pharmaceutical excipients and adjuvants used in producing various dosage forms will vary, depending upon the properties and characteristics of the excipients and adjuvants in use and the nature of the dosage form to be formulated. In general, however, pharmaceutical preparations of the present invention, in unit dosage form, will provide from about 10 mg. of coumermycin to about 400 mg. of coumermycin. The frequency with which the pharmaceutical preparations of this invention are administered will vary depending upon the level of active medicament present therein and the needs and requirements of the subject to be treated. In general, however, in the case of capsules or tablets containing 50 mg. of coumermycin, a typical adult dose is one tablet or capsule four times daily or every six hours. In the case of a capsule or tablet containing 100 mg. of coumermycin, a typical adult dose of such capsule or tablet would be one capsule every twelve hours or twice daily. It should be understood, however, that the dosages enumerated herein are exemplary only and that they are not intended to limit the scope or practice of the present invention. In any particular instance, the dosage can be adjusted to satisfy the needs and requirements of the subject to be treated.

The present invention serves to provide pharmaceutical compositions in unit dosage form, which contain coumermycin as the active ingredient. The compositions, thus produced, are suitable for use in the oral treatment of microbial infections. When so used, high blood levels will be achieved even at relatively low dosages. The invention, therefore, is of significant importance since it provides means whereby coumermycin can be self-administered by the subject, with the assurance that the active ingredient will be absorbed reliably and consistently into the blood stream. In the past, administration of coumermycin in the absence of medically trained personnel, was not feasible due to the relatively high dosages of coumermycin required to achieve therapeutically effective blood levels, reliably and consistently.

For a fuller understanding of the nature and objects of this invention, reference may be had to the following examples which are given merely as further illustrations of the invention and are not to be construed in a limiting sense.

EXAMPLE 1

In this example, the following named ingredients in the quantities hereinafter indicated, were charged into a suitable container.

| Ingredients: | Mg. per capsule |
|---|---|
| Coumermycin monosodium salt | 50 |
| Sodium tri-polyphosphate | 200 |

The named ingredients were ground together in a mortar until uniform, following which the mixture was filled into gelatin capsules.

EXAMPLE 2

In this example, the following named ingredients in the quantities hereinafter indicated, were charged into a suitable container.

| Ingredients: | Mg. per capsule |
|---|---|
| Coumermycin monosodium salt | 50 |
| Tetrasodium pyrophosphate | 200 |

The named ingredients were ground together in a mortar until uniform, following which the mixture was filled into gelatin capsules.

EXAMPLE 3

In this example, the following named ingredients, in the quantities hereinafter indicated, were charged into a suitable container.

| Ingredients: | Mg. per capsule |
|---|---|
| Coumermycin monosodium salt | 50 |
| Tetrasodium pyrophosphate | 100 |
| N-methyl glucamine | 100 |

The named ingredients were ground together in a mortar until uniform, following which the mixture was filled into gelatin capsules.

EXAMPLE 4

The compositions, produced as described in Examples 1 to 3 inclusive, were administered orally to dogs and blood level determinations were made at specific intervals. The blood assays were performed by a microbiological cup-plate assay method using *Staphylococcus aureus* as the test organism. The sensitivity of the assay is 0.08 mg./ml. in blood, and the precision of the assay is better than ±20. The blood level determinations were made 3 hours and 6 hours after the oral administration of the composition. For control purposes, capsules containing 50 mg. of coumermycin monosodium salt and no polymeric phosphate salt and no sugar amine was also administered orally to a series of dogs and blood levels determinations were made at 2 hours and 4 hours after the oral administration.

The table which follows hereinafter, sets forth the results of the blood level determination.

| | Dose, mg./kg. | Hours after administration | | | |
|---|---|---|---|---|---|
| | | 2 | 3 | 4 | 6 |
| | | Blood level, mcg./ml. | | | |
| Product of Example: | | | | | |
| 1 | 5 | | 1.9 | | 1.7 |
| 2 | 5 | | 2.4 | | 1.2 |
| 2 | 2.5 | | (.3 | | 1.2 |
| 3 | 5 | | 3.2 | | 2.0 |
| 3 | 2.5 | | 3.0 | | 2.6 |
| Control | 5 | 0.4 | | 0.6 | |

The foregoing results demonstrate that the oral administration of coumermycin in admixture with a polymeric phosphate salt, either alone or in combination with the sugar amine N-methyl glucamine, enhances its absorption into the blood stream.

What is claimed is:

1. A pharmaceutical composition for oral administration and suitable for the therapeutic treatment of infections amenable to coumermycin therapy comprising an effective amount of a mixture of (1) coumermycin free acid or a salt thereof with a medically acceptable base and (2) a member selected from the group consisting of (a) a water-soluble alkali metal polymeric phosphate salt selected from the group consisting of sodium and potassium pyrophosphates and polyphosphates and (b) a mixture of approximately equal parts by weight of said water-soluble alkali metal polymeric phosphate salt and a sugar amine selected from the group consisting of N-methylglucamine, glucosamine, N-acetyl-glucosamine and N-acetyl-galactosamine or a salt of such sugar amine with a medicinally acceptable acid, there being present in said composition from about 0.1 part by weight to about 50.0 parts by weight of said ingredient (2) for each part by weight of said ingredient (1).

2. The composition of claim 1 wherein said component (1) is coumermycin $A_1$ free acid or a salt thereof with a medicinally acceptable base.

3. The composition of claim 2 wherein said salt with a medicinally acceptable base is the monosodium salt.

4. The composition of claim 3 wherein said component (2) sodium tri-polyphosphate.

5. The composition of claim 3 wherein said component (2) is tetrasodium pyrophosphate.

6. The composition of claim 3 wherein said component (2) is a mixture of approximately equal parts by weight of tetrasodium pyrophosphate and N-methyl-glucamine.

7. A pharmaceutical composition for oral administration and suitable for the therapeutic treatment of infections amenable to coumermycin therapy comprising an effective amount of an active ingredient which comprises: (1) from about 10 mg. to about 400 mg. of coumermycin free acid or the equivalent amount of a salt thereof with a medicinally acceptable base; and (2) a water-soluble alkali metal polymeric phosphate salt selected from the group consisting of sodium and potassium pyrophosphates and polyphosphates and pharmaceutical adjuvants suitable for the oral administration of medicaments, there being present in said composition from about 0.1 part by weight to about 50.0 parts by weight of said ingredient (2) for each part by weight of said ingredient (1).

8. A method for increasing the absorption of orally administered coumermycin into the blood stream from the gastrointestinal tract which comprises administering orally a coumermycin active composition comprising an effective amount of a mixture of (1) coumermycin free acid or a salt thereof with a medicinally acceptable base and (2) a member selected from the group consisting of (a) a water-soluble alkali metal polymeric phosphate salt selected from the group consisting of sodium and potassium pyrophosphates and polyphosphates and (b) a mixture of approximately equal parts by weight of such salt with a sugar amine selected from the group consisting of N- methyl glucamine, glucosamine, N-acetyl glucosamine, and N-acetyl galactosamine or a salt of such sugar amine with a medicinally acceptable acid, there being present in said composition from about 0.1 part by weight to about 50.0 parts by weight of said ingredient (2) for each part by weight of said ingredient (1).

9. The method of claim 8 wherein said component (1) is coumermycin $A_1$ free acid or a salt thereof with a medicinally acceptable base.

10. The method of claim 9 wherein said salt with a medicinally acceptable base is the monosodium salt.

References Cited

UNITED STATES PATENTS

| 2,614,060 | 10/1952 | Rogers | 424—128 |
| 3,201,386 | 8/1965 | Kawaguchi et al. | 260—210 |

FOREIGN PATENTS

| 6613927 | 4/1967 | Netherlands. |

ALBERT T. MEYERS, Primary Examiner
V. D. TURNER, Assistant Examiner